(12) United States Patent
Suzuki et al.

(10) Patent No.: US 10,358,083 B2
(45) Date of Patent: Jul. 23, 2019

(54) IMAGE DISPLAY DEVICE

(71) Applicant: SUBARU CORPORATION, Tokyo (JP)

(72) Inventors: Dan Suzuki, Tokyo (JP); Makoto Kinoshita, Tokyo (JP); Toru Yamazumi, Tokyo (JP); Kentarou Yamasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/890,918

(22) Filed: Feb. 7, 2018

(65) Prior Publication Data
US 2018/0257549 A1    Sep. 13, 2018

(30) Foreign Application Priority Data

Mar. 10, 2017  (JP) .................................. 2017-046046

(51) Int. Cl.
*B60Q 1/50*    (2006.01)
*B60Q 1/04*    (2006.01)

(52) U.S. Cl.
CPC ................. *B60Q 1/50* (2013.01); *B60Q 1/04* (2013.01); *B60Q 2400/50* (2013.01)

(58) Field of Classification Search
CPC ........ B60Q 1/04; B60Q 1/50; B60Q 2400/50; E01F 9/20; E01F 9/559; G02B 6/001
See application file for complete search history.

(56) References Cited

U.S. PATENT DOCUMENTS

| 5,654,705 A | 8/1997 | Houten et al. |
| 6,662,108 B2 | 12/2003 | Miller et al. |
| 8,269,652 B2 | 9/2012 | Seder et al. |

(Continued)

FOREIGN PATENT DOCUMENTS

| EP | 2233356 A1 | 9/2010 |
| JP | 11-263145 A | 9/1999 |

(Continued)

OTHER PUBLICATIONS

Japanese Decision to Grant a Patent, dated Oct. 2, 2018, with English Translation, issued in related Japanese Patent Application No. 2017-046045.

(Continued)

*Primary Examiner* — Omeed Alizada
(74) *Attorney, Agent, or Firm* — McDermott Will & Emery LLP

(57) ABSTRACT

An image display device includes a light illuminator, a crossing-facility detector, an image position determiner, and an illumination controller. The light illuminator is configured to send out light frontward of a first vehicle as an own vehicle, to display an image for a pedestrian. The crossing-facility detector is configured to detect a crossing facility provided on the road. The image position determiner is configured to determine, on the basis of a position of the crossing facility, whether or not a display position of the image is included in a no-crossing region near the crossing facility. The illumination controller is configured to control display operation of the light illuminator, to prompt the pedestrian to cross along the crossing facility, on the condition that the image position determiner determines that the display position of the image is included in the no-crossing region.

17 Claims, 3 Drawing Sheets

(56) References Cited

U.S. PATENT DOCUMENTS

| | | |
|---|---|---|
| 8,954,252 B1 | 2/2015 | Urmson et al. |
| 8,996,224 B1 | 3/2015 | Herbach et al. |
| 9,135,754 B2 | 9/2015 | Ng-Thow-Hing et al. |
| 9,475,422 B2 | 10/2016 | Hillis et al. |
| 9,558,409 B2 | 1/2017 | Pliefke et al. |
| 9,575,176 B2 | 2/2017 | Baba |
| 9,654,738 B1 | 5/2017 | Ferguson et al. |
| 9,849,784 B1 | 12/2017 | Chan et al. |
| 9,896,107 B1 | 2/2018 | Huang |
| 9,902,311 B2 | 2/2018 | Sweeney et al. |
| 9,905,132 B2 | 2/2018 | Habu |
| 9,925,989 B2 | 3/2018 | Lee |
| 9,947,221 B1 | 4/2018 | Mazzola |
| 9,952,054 B2 | 4/2018 | An et al. |
| 9,969,326 B2 | 5/2018 | Ross et al. |
| 9,978,280 B2 | 5/2018 | Lee et al. |
| 9,988,047 B2 | 6/2018 | Johnson et al. |
| 10,048,688 B2 | 8/2018 | Ramasamy |
| 10,089,537 B2 | 10/2018 | Nix et al. |
| 2002/0140555 A1 | 10/2002 | Jette et al. |
| 2005/0278098 A1 | 12/2005 | Breed |
| 2006/0055525 A1 | 3/2006 | Kubota et al. |
| 2007/0067081 A1 | 3/2007 | Ton |
| 2008/0040004 A1 | 2/2008 | Breed |
| 2008/0175012 A1 | 7/2008 | Shimaoka et al. |
| 2008/0243389 A1 | 10/2008 | Inoue et al. |
| 2008/0312832 A1 | 12/2008 | Greene et al. |
| 2008/0312833 A1 | 12/2008 | Greene et al. |
| 2009/0160678 A1 | 6/2009 | Turnbull |
| 2010/0030474 A1 | 2/2010 | Sawada |
| 2010/0082251 A1 | 4/2010 | Kogure |
| 2011/0128139 A1 | 6/2011 | Tauchi et al. |
| 2011/0184617 A1 | 7/2011 | Hegemann et al. |
| 2012/0140988 A1 | 6/2012 | Takahashi |
| 2012/0194356 A1 | 8/2012 | Haines et al. |
| 2012/0224060 A1 | 9/2012 | Gurevich et al. |
| 2013/0057690 A1 | 3/2013 | Mitsugi |
| 2014/0062685 A1 | 3/2014 | Tamatsu et al. |
| 2014/0152488 A1 | 6/2014 | Baba |
| 2015/0103174 A1 | 4/2015 | Emura et al. |
| 2015/0179073 A1 | 6/2015 | Suzuno |
| 2015/0194082 A1 | 7/2015 | McEwan |
| 2015/0334269 A1 | 11/2015 | Yokota et al. |
| 2016/0039286 A1 | 2/2016 | Shibata et al. |
| 2016/0093207 A1 | 3/2016 | Di Censo et al. |
| 2016/0115650 A1 | 4/2016 | Leung |
| 2016/0247393 A1 | 8/2016 | Okamoto et al. |
| 2016/0332568 A1 | 11/2016 | Kim |
| 2017/0043705 A1 | 2/2017 | Mizuno |
| 2017/0140651 A1 | 5/2017 | Lee et al. |
| 2017/0182934 A1 | 6/2017 | Arita et al. |
| 2017/0210283 A1 | 7/2017 | Ishida |
| 2017/0217361 A1 | 8/2017 | Miller |
| 2017/0217368 A1 | 8/2017 | Lewis et al. |
| 2017/0217422 A1 | 8/2017 | Nakamura |
| 2017/0240096 A1 | 8/2017 | Ross et al. |
| 2017/0253177 A1 | 9/2017 | Kawamata et al. |
| 2017/0253181 A1 | 9/2017 | Choi et al. |
| 2017/0259734 A1 | 9/2017 | Imaishi et al. |
| 2017/0276308 A1 | 9/2017 | Nakazawa et al. |
| 2017/0330463 A1 | 11/2017 | Li et al. |
| 2017/0337821 A1 | 11/2017 | Masuda et al. |
| 2017/0372613 A1 | 12/2017 | Habu |
| 2018/0009374 A1 | 1/2018 | Kim et al. |
| 2018/0024562 A1 | 1/2018 | Bellaiche |
| 2018/0025235 A1 | 1/2018 | Fridman |
| 2018/0033306 A1 | 2/2018 | Kim et al. |
| 2018/0086346 A1 | 3/2018 | Fujisawa et al. |
| 2018/0118099 A1 | 5/2018 | Kunii et al. |
| 2018/0118106 A1 | 5/2018 | You et al. |
| 2018/0134286 A1 | 5/2018 | Yi et al. |
| 2018/0141484 A1 | 5/2018 | Haneda et al. |
| 2018/0173234 A1 | 6/2018 | Van Laack et al. |
| 2018/0173237 A1 | 6/2018 | Reiley et al. |
| 2018/0218601 A1 | 8/2018 | Aoki et al. |
| 2018/0247540 A1 | 8/2018 | Hagawa et al. |
| 2018/0250596 A1 | 9/2018 | Kim |
| 2018/0253609 A1 | 9/2018 | Potter et al. |
| 2018/0257547 A1 | 9/2018 | Suzuki et al. |
| 2018/0257549 A1 | 9/2018 | Suzuki et al. |
| 2018/0257550 A1 | 9/2018 | Suzuki et al. |
| 2018/0261080 A1 | 9/2018 | Suzuki et al. |
| 2018/0261081 A1 | 9/2018 | Suzuki et al. |

FOREIGN PATENT DOCUMENTS

| | | |
|---|---|---|
| JP | 2006-252264 A | 9/2006 |
| JP | 2008-007079 A | 1/2008 |
| JP | 2008-143510 A | 6/2008 |
| JP | 2009-149152 A | 7/2009 |
| JP | 2009-230701 A | 10/2009 |
| JP | 4720650 B2 | 7/2011 |
| JP | 2013-203251 A | 10/2013 |
| JP | 2014-189198 A | 10/2014 |
| JP | 2015-205572 A | 11/2015 |
| JP | 2016-020876 A | 2/2016 |
| JP | 2016-107777 A | 6/2016 |
| JP | 2017-001501 A | 1/2017 |
| JP | 2017-007502 A | 1/2017 |
| JP | 2017-049885 A | 3/2017 |
| JP | 2017-159699 A | 9/2017 |
| WO | 2016/024316 A1 | 2/2016 |
| WO | 2016/039288 A1 | 3/2016 |
| WO | 2016/163294 A1 | 10/2016 |

OTHER PUBLICATIONS

Japanese Office Action, dated Jul. 24, 2018, with English Translation, issued in related Japanese Patent Application No. 2017-046047.

Japanese Office Action, dated Jul. 24, 2018, with English Translation, issued in related Japanese Patent Application No. 2017-046045.

Japanese Office Action, dated Aug. 7, 2018, with English Translation, issued in related Japanese Patent Application No. 2017-046050.

Japanese Office Action, dated Sep. 11, 2018, with English Translation, issued in related Japanese Patent Application No. 2017-046052.

Non-Final Office Action issued in related U.S. Appl. No. 15/877,859, dated Oct. 17, 2018.

Non-Final Office Action issued in related U.S. Appl. No. 15/890,963, dated Jul. 11, 2018.

Non-Final Office Action issued in related U.S. Appl. No. 15/888,791, dated Oct. 25, 2018.

Non-Final Office Action issued in related U.S. Appl. No. 15/877,901, dated Jun. 4, 2018.

Final Office Action issued in related U.S. Appl. No. 15/877,901, dated Oct. 30, 2018.

Notice of Allowance issued in related U.S. Appl. No. 15/890,963, dated Dec. 19, 2018.

Notice of Allowance issued in related U.S. Appl. No. 15/888,858, dated Feb. 8, 2019.

Notice of Allowance issued in related U.S. Appl. No. 15/877,901, dated Feb. 20, 2019.

Japanese Office Action issued in corresponding Japanese Patent Application No. 2017-046049, dated Aug. 7, 2018, with English Translation.

Japanese Office Action issue in corresponding Japanese Patent Application No. 2017-046452, dated Aug. 21, 2018, with English Translation.

Non-Final Office Action issued in related U.S. Appl. No. 15/888,858, dated Jul. 24, 2018.

Notice of Allowance issued in related U.S. Appl. No. 15/888,791, dated Mar. 15, 2019.

IMAGE DISPLAY DEVICE

CROSS-REFERENCE TO RELATED APPLICATIONS

The present application claims priority from Japanese Patent Application No. 2017-046046 filed on Mar. 10, 2017, the entire contents of which are hereby incorporated by reference.

BACKGROUND

The technology relates to an image display device that sends out light frontward of an automobile, to display an image.

Some image display devices send out light frontward of an automobile, to display an image on a road. For example, such an image display device displays an image of permission to cross a road for a pedestrian, and thereby lets the pedestrian know the driver's intention, attempting to allow the pedestrian to cross safely.

There have been pursuits of an image display device that clearly notifies the pedestrian of information, to give the pedestrian a prompt understanding of the image displayed on the road.

For example, Japanese Patent (JP-B) No. 4720650 proposes a road-surface projection device that gives an easily understandable warning to a moving body such as a pedestrian. If the pedestrian is in a determination region, the road-surface projection device projects an image on a road surface. The image includes a stop line, characters "STOP", and a crosswalk. This makes it possible to notify the pedestrian of information clearly.

SUMMARY

As described, in an image display device that sends out light frontward of the own vehicle, to display an image, it is desired to guide a pedestrian with enhanced safety.

It is desirable to provide an image display device that makes it possible to guide a pedestrian with enhanced safety.

An aspect of the technology provides an image display device including a light illuminator, a crossing-facility detector, an image position determiner, and an illumination controller. The light illuminator is configured to send out light frontward of a first vehicle as an own vehicle, to display an image for a pedestrian who waits to cross a road. The crossing-facility detector is configured to detect a crossing facility provided on the road. The crossing facility allows the pedestrian to cross. The image position determiner is configured to determine, on the basis of a position of the crossing facility detected by the crossing-facility detector, whether or not a display position of the image is included in a no-crossing region near the crossing facility. The illumination controller is configured to control display operation of the light illuminator, to prompt the pedestrian to cross along the crossing facility, on the condition that the image position determiner determines that the display position of the image is included in the no-crossing region.

An aspect of the technology provides an image display device including a light illuminator, a crossing-facility detector, and circuitry. The light illuminator is configured to send out light frontward of a first vehicle as an own vehicle, to display an image for a pedestrian who waits to cross a road. The crossing-facility detector is configured to detect a crossing facility provided on the road. The crossing facility allows the pedestrian to cross. The circuitry is configured to control display operation of the light illuminator, on the basis of a position of the crossing facility detected by the crossing-facility detector. The circuitry is configured to determine whether or not a display position of the image is included in a no-crossing region near the crossing facility. The circuitry is configured to control the display operation of the light illuminator, to prompt the pedestrian to cross along the crossing facility, on the condition that the display position of the image is determined as being included in the no-crossing region.

DETAILED DESCRIPTION

In the following, some implementations of the technology are described with reference to the drawings.

First Implementation

Figure 1:
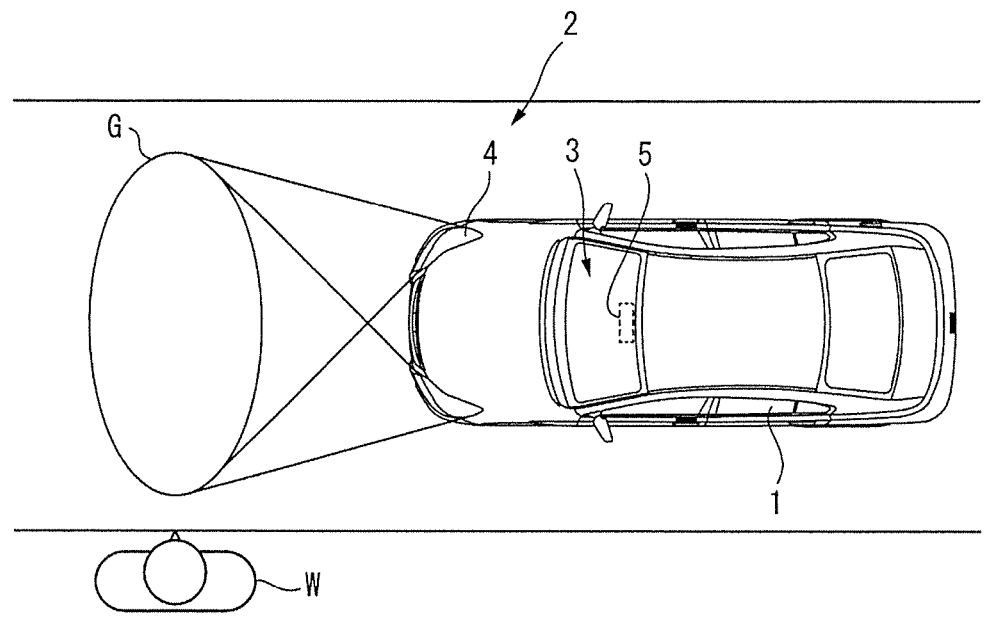
FIG. 1 illustrates a configuration of an automobile including an image display device according to a first implementation of the technology.

FIG. 1 illustrates a configuration of an automobile including an image display device according to a first implementation of the technology. The automobile may include an automobile body 1 and an image display device 2.

The automobile body 1 may include headlights and a front windshield. The headlights may be disposed in a front part of the automobile body 1. The front windshield may be disposed on front side of a driver's seat where a driver drives the automobile.

The image display device 2 may include an operation unit 3, a light illuminator 4, and a crossing-facility detector 5. The operation unit 3 may be disposed near the driver's seat of the automobile body 1. The light illuminator 4 may be disposed in the front part of the automobile body 1. The crossing-facility detector 5 may be disposed near an upper part of the front windshield.

The operation unit 3 may be a unit with which the driver performs an operation of the image display device 2.

The light illuminator 4 sends out light frontward of the automobile body 1, to display an image G for a pedestrian W who waits to cross a road. The light illuminator 4 may be unitized with the headlights of the automobile body 1. The light illuminator 4 may display, for example, a permission-to-cross image, a no-crossing image, and a pedestrian-guidance image. The permission-to-cross image permits the pedestrian W to cross. The no-crossing image prohibits the pedestrian W from crossing. The pedestrian-guidance image guides the pedestrian W to a crossing facility.

The permission-to-cross image may include, for example, image display of a crosswalk and character display of "Please Cross". The no-crossing image may include, for example, image display of a stop line and character display of "No Crossing". The pedestrian-guidance image may include, for example, character display of "Cross along Nearby Crossing Facility".

It is to be noted that the term "pedestrian W" means, for example, a person who passes along a sidewalk, and a person who rides a bicycle along a road end.

The crossing-facility detector 5 may detect the crossing facility provided on the road. The crossing facility allows the pedestrian W to cross with enhanced safety. The crossing-facility detector 5 may include, for example, a camera, and be able to detect the crossing facility on the basis of images captured by the camera. Non-limiting examples of the crossing facility may include a crosswalk and a footbridge.

Description is given next of details of the image display device 2.

Figure 2:
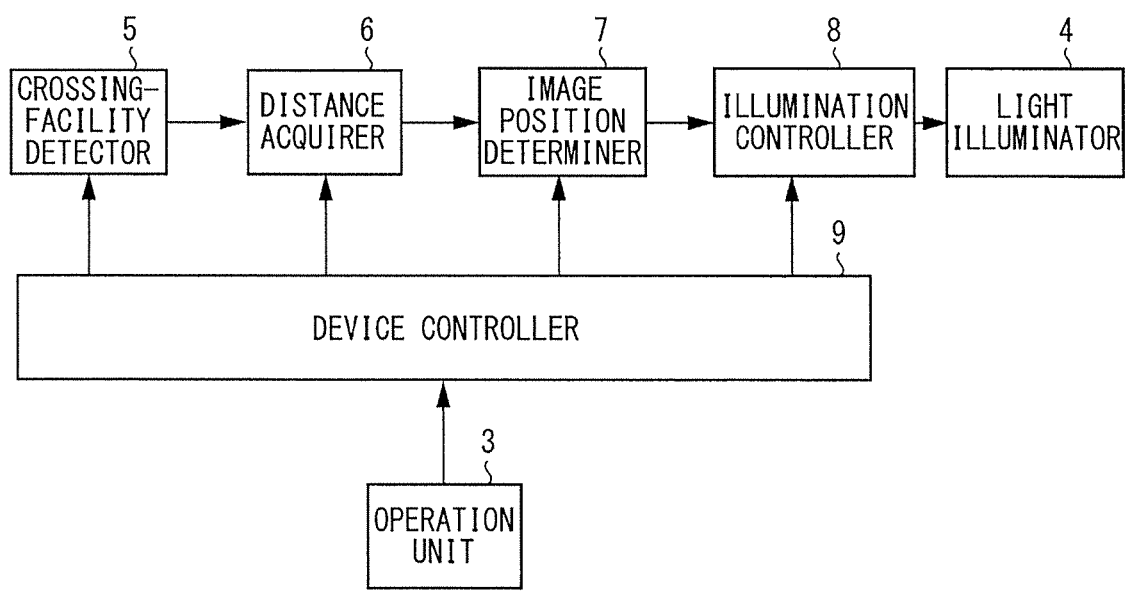
FIG. 2 is a block diagram of a configuration of the image display device.

Referring to FIG. 2, the image display device 2 may include a distance acquirer 6. The distance acquirer 6 may be coupled to the crossing-facility detector 5. The distance acquirer 6 may be coupled to the light illuminator 4 through an image position determiner 7 and an illumination controller 8. Moreover, a device controller 9 may be coupled to the crossing-facility detector 5, the distance acquirer 6, the image position determiner 7, and the illumination controller 8. The operation unit 3 may be coupled to the device controller 9.

The distance acquirer 6 may calculate a distance from an own vehicle to the crossing facility, on the basis of a position of the crossing facility detected by the crossing-facility detector 5. For example, the distance acquirer 6 may be able to calculate the distance, on the basis of image data obtained by the crossing-facility detector 5, with the use of, for example, a triangulation method.

The image position determiner 7 may calculate a distance from the crossing facility to a display position of the image G, on the basis of the distance from the own vehicle to the crossing facility calculated by the distance acquirer 6 and on the basis of the display position of the image G to be displayed by the light illuminator 4. Thereafter, on the basis of the calculated distance from the crossing facility to the display position of the image G, the image position determiner 7 may determine whether or not the display position of the image G is included in a no-crossing region near the crossing facility. Here, the no-crossing region is a region where the pedestrian W is obliged to cross along the crossing facility. For example, as to a road with heavy traffic and with a road width of about 14 meters or more, the no-crossing region may be a region of about 50 meters or less from the crossing facility. As to other roads, in one preferred but non-limiting example, the no-crossing region may be set at a region of about 30 meters or less from the crossing facility.

The illumination controller 8 may control the light illuminator 4 to display the no-crossing image, in a case where the image position determiner 7 determines that the display position of the image G is included in the no-crossing region. The no-crossing image prohibits the pedestrian W from crossing the road. Meanwhile, in a case where the image position determiner 7 determines that the display position of the image G falls out of the no-crossing region, the illumination controller 8 may control the light illuminator 4 in accordance with an operation performed with the operation unit 3.

The operation unit 3 may allow the driver who drives the automobile body 1 to operate the light illuminator 4 through the device controller 9.

The device controller 9 may perform a control of each unit in the image display device 2 on the basis of, for example, various operation signals inputted from the operation unit 3.

It is to be noted that the distance acquirer 6, the image position determiner 7, the illumination controller 8, and the device controller 9 may include a central processing unit (CPU) and an operation program that causes the CPU to perform various kinds of processing. However, the distance acquirer 6, the image position determiner 7, the illumination controller 8, and the device controller 9 may include a digital circuit.

Description now moves on to operation according to the first implementation.

First, as illustrated in FIG. 1, the driver who drives the automobile body 1 causes the automobile to stop in front of the pedestrian W who waits to cross the road. Thereafter, the driver operates the operation unit 3, to allow the light illuminator 4 to display the permission-to-cross image for the pedestrian W. At this occasion, as illustrated in FIG. 2, operational information such as the display position of the permission-to-cross image is inputted to the device controller 9 from the operation unit 3.

Figure 3:
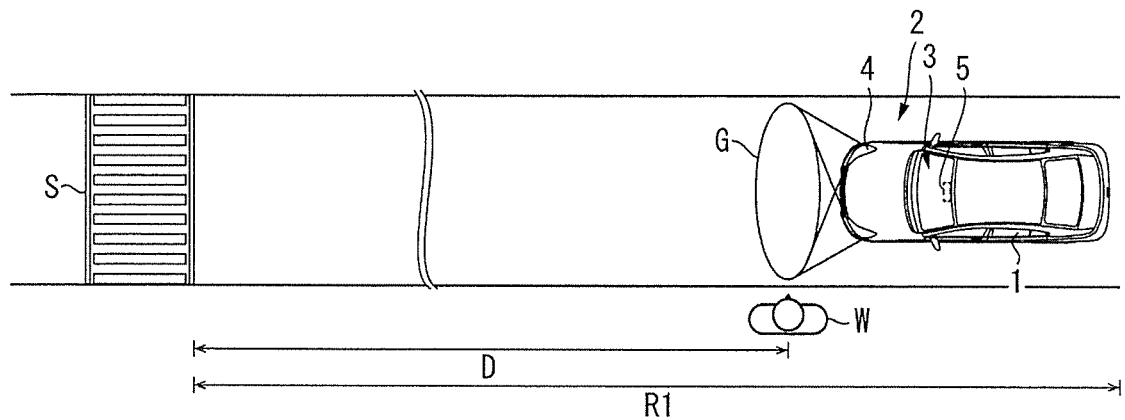
FIG. 3 illustrates how the image display device displays an image on a road near a crossing facility.

As described, upon the operational information being inputted to the device controller 9 from the operation unit 3, as illustrated in FIG. 3, the crossing-facility detector 5 detects, under a control of the device controller 9, a crosswalk provided frontward of the automobile body 1, as the crossing facility S. The crossing-facility detector 5 outputs positional information on the crossing facility S detected, to the distance acquirer 6.

Upon the positional information on the crossing facility S being inputted to the distance acquirer 6 from the crossing-facility detector 5, the distance acquirer 6 calculates the distance from the own vehicle to the crossing facility S on the basis of the positional information on the crossing facility S. The distance acquirer 6 outputs the calculated distance to the image position determiner 7.

The image position determiner 7 is supplied with the distance from the own vehicle to the crossing facility S from the distance acquirer 6, and is supplied, through the device controller 9, with the display position of the image G from the operation unit 3. Thereafter, the image position determiner 7 calculates the distance D from the crossing facility S to the display position of the image G, on the basis of the distance from the own vehicle to the crossing facility S and on the basis of the display position of the image G. Moreover, the image position determiner 7 determines whether the display position of the image G is included in the no-crossing region R1, on the basis of the distance D calculated. A determination result is outputted to the illumination controller 8 from the image position determiner 7.

In a case where the image position determiner 7 determines that the display position of the image G is included in the no-crossing region R1, the illumination controller 8 controls the light illuminator 4, to compulsively display the no-crossing image on the road, regardless of the operation performed with the operation unit 3. This makes it possible to allow the pedestrian W to recognize that they are prohibited from crossing. Hence it is possible to guide the pedestrian W to the crossing facility S where the pedestrian W is able to cross with enhanced safety.

In one alternative, in the case where the image position determiner 7 determines that the display position of the image G is included in the no-crossing region R1, the illumination controller 8 may control the light illuminator 4, to display the pedestrian-guidance image together with the no-crossing image. Hence, it is possible to guide the pedestrian W to the crossing facility S.

It is to be noted that the illumination controller 8 may control the light illuminator 4 to display solely the pedestrian-guidance image, without displaying the no-crossing image.

Meanwhile, in the case where the image position determiner 7 determines that the display position of the image G falls out of the no-crossing region R1, the illumination controller 8 allows the light illuminator 4 to display the permission-to-cross image on the road, in accordance with the operation performed with the operation unit 3.

As described, in the image display device 2, the distance D from the crossing facility S to the display position of the image G may be obtained on the basis of the position of the crossing facility S detected by the crossing-facility detector 5. In the case where the display position of the image G is included in the no-crossing region R1, for example, the no-crossing image may be displayed on the road. Hence, it is possible to guide the pedestrian W with enhanced safety. Meanwhile, for example, in the road-surface projection device as in JP-B No. 4720650, an image to be displayed on the road is selected regardless of surrounding road facilities. This makes it difficult to guide the pedestrian with enhanced safety. Specifically, for example, displaying the permission-to-cross image near the crossing facility such as the crosswalk and the footbridge may result in possibility that the pedestrian W is made to cross the road with a lower level of safety, instead of crossing along the crossing facility S with a higher level of safety. In contrast, in the image display device 2, in the case where the display position of the image G is included in the no-crossing region R1, for example, the no-crossing image may be displayed on the road. This leads to reduction in the possibility that the pedestrian W is made to cross the road at a position near the crossing facility S. Hence, it is possible to guide the pedestrian W to the crossing facility S with enhanced safety.

In this implementation, in the case where the image position determiner 7 determines that the display position of the image G is included in the no-crossing region R1, the illumination controller 8 controls display operation of the light illuminator 4, to prompt the pedestrian W to cross along the crossing facility S. Hence, it is possible to guide the pedestrian W with enhanced safety.

Second Implementation

In the first implementation, in the case where the image position determiner 7 determines that the display position of the image G is included in the no-crossing region R1, the illumination controller 8 may control the light illuminator 4 to display the no-crossing image or the pedestrian-guidance image on the road. However, this is non-limiting. Any control may be sufficient insofar as the illumination controller 8 is able to control the display operation of the light illuminator 4, to prompt the pedestrian W to cross along the crossing facility S.

For example, in the case where the image position determiner 7 determines that the display position of the image G is included in the no-crossing region R1, the illumination controller 8 may make the light illuminator 4 stop sending out light. In other words, the illumination controller 8 may compulsively make the light illuminator 4 stop displaying the image G, regardless of the operation performed with the operation unit 3. This makes it possible to allow the pedestrian W to recognize that they are prohibited from crossing the road, and to allow the driver who operates the operation unit 3 to recognize that the pedestrian W is prohibited from crossing the road. Hence, it is possible to guide the pedestrian W to the crossing facility S with enhanced safety.

In this implementation, in the case where the image position determiner 7 determines that the display position of the image G is included in the no-crossing region R1, the illumination controller 8 may make the light illuminator 4 stop sending out light. Hence, it is possible to guide the pedestrian W with enhanced safety.

Third Implementation

In the first and the second implementations, in the case where the image position determiner 7 determines that the display position of the image G is included in the no-crossing region R1, the illumination controller 8 may control the display operation of the light illuminator 4, to prompt the pedestrian W to cross along the crossing facility S. However, in the case where the image position determiner 7 determines that the display position of the image G falls out of the no-crossing region R1, the illumination controller 8 may also control the display operation of the light illuminator 4, to allow the pedestrian W to cross along the crossing facility S.

Figure 4:
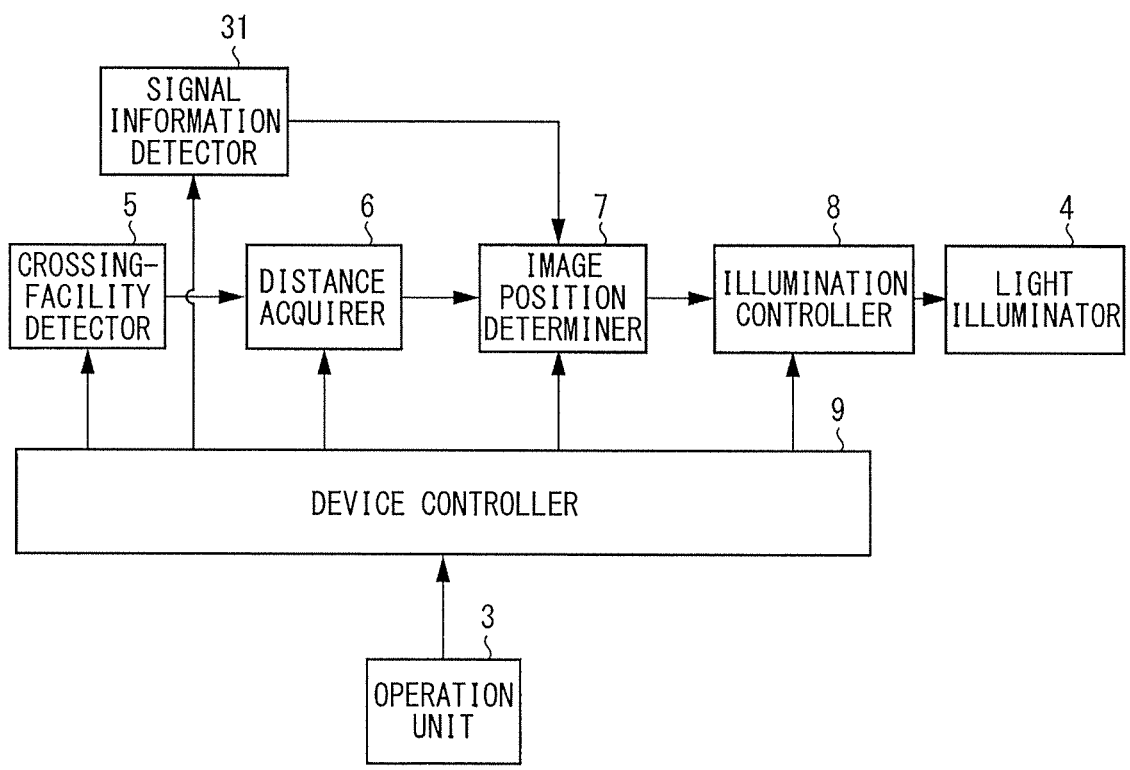
FIG. 4 is a block diagram of a configuration of an image display device according to a second implementation.

For example, as illustrated in FIG. 4, in the first implementation, a signal information detector 31 may be newly coupled to the image position determiner 7.

The signal information detector 31 may detect display information on a signal for automobiles at an intersection at which the crossing facility S is provided. As the signal information detector 31, for example, a camera may be used.

Figure 5:
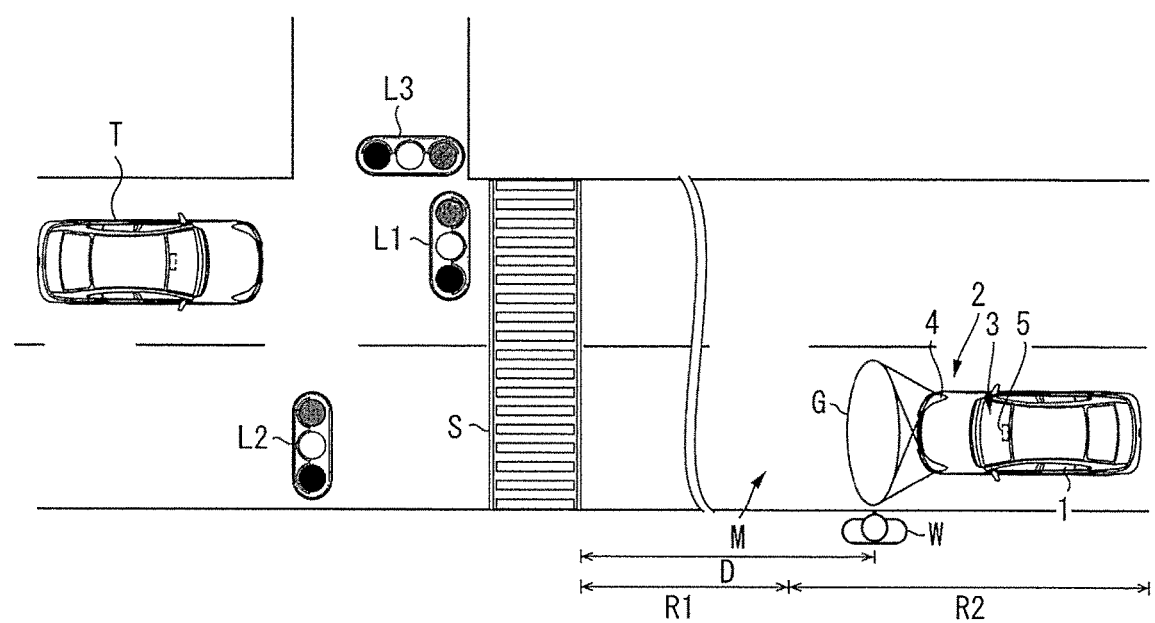
FIG. 5 illustrates how the image display device displays an image on a road near a caution-against-crossing region.

First, as illustrated in FIG. 5, upon the automobile being stopped in front of the pedestrian W who waits to cross the road, the operational information on the image display device 2 is inputted from the operation unit 3. At this occasion, as with the first implementation, the crossing-facility detector 5 detects the crossing facility S, while the distance acquirer 6 calculates the distance from the own vehicle to the crossing facility S on the basis of the position of the crossing facility S detected by the crossing-facility detector 5.

Here, the signal information detector 31 detects the display information on the signal L1 for automobiles of an opposite lane of the road M where the image G is to be displayed, out of the signals L1, L2, and L3 for automobiles at the intersection at which the crossing facility S is provided. At this occasion, the signal information detector 31 detects whether the display information on the signal L1 for automobiles is a blue light or whether the display information on the signal L1 for automobiles is a red or yellow light. The blue light allows a surrounding vehicle T traveling on the opposite lane to move straight to the road M. The red or yellow light makes the surrounding vehicle T stop.

In this way, the distance from the own vehicle to the crossing facility S calculated by the distance acquirer 6 is outputted to the image position determiner 7, while the display information on the signal L1 for automobiles detected by the signal information detector 31 is outputted to the image position determiner 7.

Thereafter, the image position determiner 7 calculates the distance D from the crossing facility S to the display position of the image G, on the basis of the position of the crossing facility S detected by the crossing-facility detector 5. The image position determiner 7 determines whether or not the display position of the image G is included in the no-crossing region R1. Upon determining that the display position of the image G falls out of the no-crossing region R1, the image position determiner 7 further determines whether or not the display position of the image G is near the no-crossing region R1. Specifically, the image position determiner 7 further determines whether or not the display position of the image G is included in a caution-against-crossing region R2. The caution-against-crossing region R2 may be a region of a predetermined distance or less, e.g., about 50 meters or less, from the no-crossing region R1. Because the caution-against-crossing region R2 is near the no-crossing region R1, crossing the road M in the caution-against-crossing region R2 necessitates being cautious. In the caution-against-crossing region R2, crossing along the crossing facility S is preferred in a case with heavy traffic, e.g., in a case where the display information on the signal L1 for automobiles is the blue light. The image position determiner 7 outputs a determination result to the illumination controller 8.

In a case where the signal information detector 31 detects the display information that the signal L1 for automobiles is the blue light, and the image position determiner 7 determines that the display position of the image G is included in the caution-against-crossing region R2, the illumination controller 8 controls the display operation of the light illuminator 4, to prompt the pedestrian W to cross along the crossing facility S, regardless of the operation performed with the operation unit 3.

In this implementation, in a case with the road M with heavy traffic, and with the display position of the image G being included in the caution-against-crossing region R2, the illumination controller 8 controls the display operation of the light illuminator 4, to prompt the pedestrian W to cross along the crossing facility S. Hence, it is possible to guide the pedestrian W with more enhanced safety.

It is to be noted that in the first to the third implementations as described above, the crossing-facility detector 5 may actually make a measurement of the road with the use of, for example, a camera, to detect the crossing facility S. However, the crossing-facility detector 5 is not limited to a unit that actually makes the measurement of the road, insofar as the crossing-facility detector 5 is able to detect the crossing facility S.

For example, the crossing-facility detector 5 may store in advance positional information on the crossing facility S with respect to the road. The crossing-facility detector 5 may be able to detect the crossing facility S on the basis of the stored positional information on the crossing facility S and on the basis of positional information on the own vehicle. As the crossing-facility detector 5, for example, a car navigation system may be used.

Moreover, in the first to the third implementations as described above, the image position determiner 7 may determine whether or not the display position of the image G by the light illuminator 4 is included in the no-crossing region R1 near the crossing facility S. However, in a case where the image G is displayed immediately in front of the automobile body 1, the image position determiner 7 may assume that the display position of the image G is substantially the same as a position of the automobile body 1, and determine whether or not the display position of the image G is included in the no-crossing region R1 on the basis of the position of the automobile body 1.

Furthermore, in the first to the third implementations as described above, the operation unit 3 may be eliminated. In other words, the illumination controller 8 may automatically select, on the basis of the determination result by the image position determiner 7, the image G to be displayed on the road. The illumination controller 8 may control the light illuminator 4 to display the image G thus selected.

In addition, in the first to the third implementations as described above, the light illuminator 4 may be unitized with the headlights of the automobile body 1. However, the light illuminator 4 may be disposed separately from the headlights. The light illuminator 4 may include various kinds of light sources, e.g., a lamp, a light emitting diode (LED), a digital mirror device, and a projector.

In one implementation described above, the distance acquirer 6, the image position determiner 7, the illumination controller 8, and the device controller 9 illustrated in FIGS. 2 and 4 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the distance acquirer 6, the image position determiner 7, the illumination controller 8, and the device controller 9. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIGS. 2 and 4.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:
1. An image display device, comprising:
a light illuminator configured to send out visible light frontward of a first vehicle as an own vehicle, to display an image for a pedestrian attempting to cross a road;
a crossing-facility detector configured to detect a position of a crossing facility provided on the road, the crossing facility allowing the pedestrian to cross the road;
an image position determiner configured to determine, based on the position of the crossing facility, whether a display position of the image is within a no-crossing region, the no-crossing region extending for a first distance from the crossing facility; and
an illumination controller configured to control the light illuminator to display a first image based on determining that the display position of the image is within the no-crossing region, the first image prompting the pedestrian to use the crossing facility to cross the road.
2. The image display device according to claim 1, wherein the illumination controller controls the light illuminator to display, concurrently with the first image, a second image based on determining that the display position of the image is within the no-crossing region, the second image prohibiting the pedestrian from crossing the road.

3. The image display device according to claim 1, wherein the first image comprises a pedestrian-guidance image guiding the pedestrian to the crossing facility.

4. The image display device according to claim 2, wherein the first image comprises a pedestrian-guidance image guiding the pedestrian to the crossing facility.

5. The image display device according to claim 1, further comprising a signal information detector configured to detect signal display information on one or more traffic signals for automobiles at an intersection at which the crossing facility is provided, wherein
the image position determiner determines whether the display position of the image is within a caution-against-crossing region based on determining that the display position of the image is outside the no-crossing region, the caution-against-crossing region extending for a second distance from the no-crossing region, and
the illumination controller controls the light illuminator to display the first image prompting the pedestrian to use the crossing facility to cross the road based on determining that 1) the display position of the image is within the caution-against-crossing region and 2) the signal display information indicates a state in which a second vehicle other than the first vehicle is allowed to enter a region on the road where the pedestrian is attempting to cross the road.

6. The image display device according to claim 2, further comprising a signal information detector configured to detect signal display information on one or more traffic signals for automobiles at an intersection at which the crossing facility is provided, wherein
the image position determiner determines whether the display position of the image is within a caution-against-crossing region based on determining that the display position of the image is outside the no-crossing region, the caution-against-crossing region extending for a second distance from the no-crossing region, and
the illumination controller controls the light illuminator to display the first image prompting the pedestrian to use the crossing facility to cross the road based on determining that 1) the display position of the image is within the caution-against-crossing region and 2) the signal display information indicates a state in which a second vehicle other than the first vehicle is allowed to enter a region on the road where the pedestrian is attempting to cross the road.

7. The image display device according to claim 3, further comprising a signal information detector configured to detect signal display information on one or more traffic signals for automobiles at an intersection at which the crossing facility is provided, wherein
the image position determiner determines whether the display position of the image is included in within a caution-against-crossing region based on determining that the display position of the image is outside the no-crossing region, the caution-against-crossing region extending for a second distance from the no-crossing region, and
the illumination controller controls the light illuminator to display the first image prompting the pedestrian to use the crossing facility to cross the road based on determining that 1) the display position of the image is within the caution-against-crossing region and 2) the signal display information indicates a state in which a second vehicle other than the first vehicle is allowed to enter a region on the road where the pedestrian is attempting to cross the road.

8. The image display device according to claim 4, further comprising a signal information detector configured to detect signal display information on one or more traffic signals for automobiles at an intersection at which the crossing facility is provided, wherein
the image position determiner determines whether the display position of the image is included in within a caution-against-crossing region based on determining that the display position of the image is outside the no-crossing region, the caution-against-crossing region extending for a second distance from the no-crossing region, and
the illumination controller controls the light illuminator to display the first image prompting the pedestrian to use the crossing facility to cross the road based on determining that 1) the display position of the image is within the caution-against-crossing region and 2) the signal display information indicates a state in which a second vehicle other than the first vehicle is allowed to enter a region on the road where the pedestrian is attempting to cross the road.

9. The image display device according to claim 5, wherein the second distance is about 50 meters.

10. The image display device according to claim 6, wherein
the second distance is about 50 meters.

11. The image display device according to claim 7, wherein
the second distance is about 50 meters.

12. The image display device according to claim 8, wherein
the second distance is about 50 meters.

13. The image display device according to claim 1, wherein
the light illuminator includes headlights.

14. The image display device according to claim 2, wherein
the light illuminator includes headlights.

15. The image display device according to claim 3, wherein
the light illuminator includes headlights.

16. The image display device according to claim 4, wherein
the light illuminator includes headlights.

17. An image display device, comprising:
a light illuminator configured to send out visible light frontward of a first vehicle as an own vehicle, to display an image for a pedestrian attempting to cross a road;
a crossing-facility detector configured to detect a position of a crossing facility provided on the road, the crossing facility allowing the pedestrian to cross the road; and
circuitry configured to
determine a display position of the image is within in a no-crossing region extending for a first distance from the crossing facility, and
control, in response determining that the display position of the image is within the no-crossing region, the light illuminator to display the image prompting the pedestrian to use the crossing facility to cross the road and guiding the pedestrian to the crossing facility.

* * * * *